(12) United States Patent
Sanderse

(10) Patent No.: US 12,158,136 B2
(45) Date of Patent: Dec. 3, 2024

(54) ROPE DRIVER, PORTABLE DEVICE FOR DRIVING A ROPE COMPRISING A ROPE DRIVER, KIT, METHOD AND USE

(71) Applicants: Gilles Sanderse, Heerlen (NL); Michel Sanderse, Eindhoven (NL)

(72) Inventor: Michel Sanderse, Eindhoven (NL)

(73) Assignees: Gilles Sanderse, Heerlen (NL); Michel Sanderse, Eindhoven (NL)

( * ) Notice: Subject to any disclaimer, the term of this patent is extended or adjusted under 35 U.S.C. 154(b) by 413 days.

(21) Appl. No.: 17/784,343

(22) PCT Filed: Dec. 11, 2020

(86) PCT No.: PCT/NL2020/050780
§ 371 (c)(1),
(2) Date: Jun. 10, 2022

(87) PCT Pub. No.: WO2021/118357
PCT Pub. Date: Jun. 17, 2021

(65) Prior Publication Data
US 2023/0087633 A1 Mar. 23, 2023

(30) Foreign Application Priority Data
Dec. 12, 2019 (NL) .................................. 2024446

(51) Int. Cl.
*F03D 80/50* (2016.01)
*A62B 1/06* (2006.01)
(Continued)

(52) U.S. Cl.
CPC ................ *F03D 80/50* (2016.05); *A62B 1/06* (2013.01); *A62B 35/0068* (2013.01);
(Continued)

(58) Field of Classification Search
CPC ....... F03D 80/50; A62B 1/06; A62B 35/0068; B66C 23/207; B66D 1/7415; B66D 1/7489
See application file for complete search history.

(56) References Cited

U.S. PATENT DOCUMENTS

| 4,165,830 A | | 8/1979 | Svendsen |
| 4,932,198 A | * | 6/1990 | Eisenhauer ............ D02G 3/285 57/352 |

(Continued)

FOREIGN PATENT DOCUMENTS

| CN | 206934462 U | 1/2018 | |
| DE | 19817933 A1 * | 11/1999 | ............... B66D 1/38 |

OTHER PUBLICATIONS

European Patent Office, International Search Report in corresponding International Application No. PCT/NL2020/050780, dated Mar. 18, 2021 (2 pages).

(Continued)

*Primary Examiner* — Octavia Hollington
(74) *Attorney, Agent, or Firm* — Leydig, Voit & Mayer, Ltd.

(57) ABSTRACT

A portable device for hoisting/lowering/storing a rope from a tall structure, such as a is described. The device is formed of an assembly of a rope storage container and a rope driver reversibly connected thereto. The rope storage container defines a rope storage volume bound between a bottom surface and an outer side wall. The rope driver is reversibly connectable to the container and comprises a rope passage having a dimension matching a diameter of the rope. The passage is formed between a pair of adjacent rollers or between a drive coil and a clamp. The rope is driven (hoisted and stored or provided and lowered) by an electric motor arranged to drive at least one of the rollers or the drive coil.

21 Claims, 9 Drawing Sheets

(51) Int. Cl.
    *A62B 35/00*    (2006.01)
    *B66C 23/20*    (2006.01)
    *B66D 1/74*     (2006.01)
(52) U.S. Cl.
    CPC .......... *B66C 23/207* (2013.01); *B66D 1/7415* (2013.01); *B66D 1/7489* (2013.01)

(56) References Cited

U.S. PATENT DOCUMENTS

| | | | |
|---|---|---|---|
| 6,796,522 B2 * | 9/2004 | Braun | A62B 1/06 |
| | | | 242/360 |
| 9,415,244 B2 * | 8/2016 | Cazzaro | A62B 1/14 |
| 9,862,574 B2 * | 1/2018 | Lehtinen | B66B 19/02 |
| 10,501,294 B1 | 12/2019 | Solberg | |
| 2003/0136870 A1 | 7/2003 | Braun | |
| 2016/0236921 A1 | 8/2016 | Azzarelli | |

OTHER PUBLICATIONS

P.R. China, First Office Action in corresponding Chinese Patent Office Action 202080094123.X, dated Jan. 19, 2023.

* cited by examiner

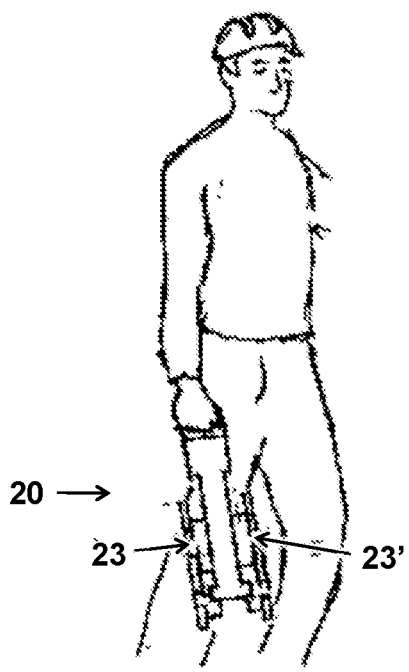
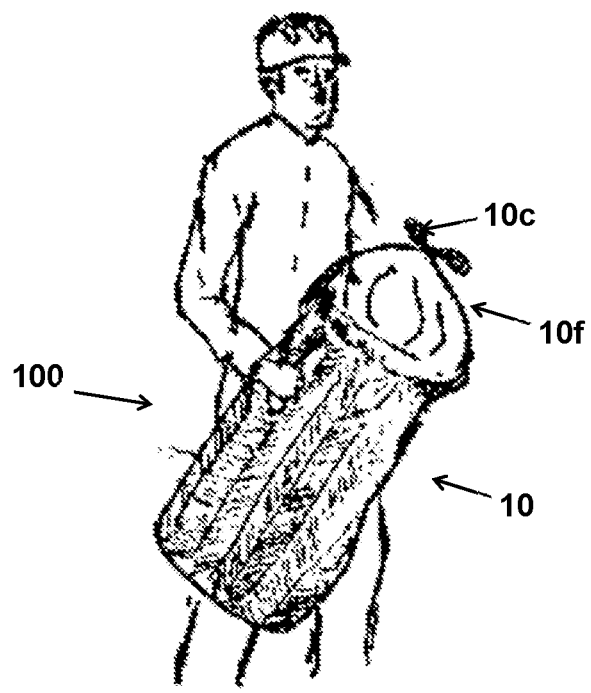
FIG 3A
FIG 3B
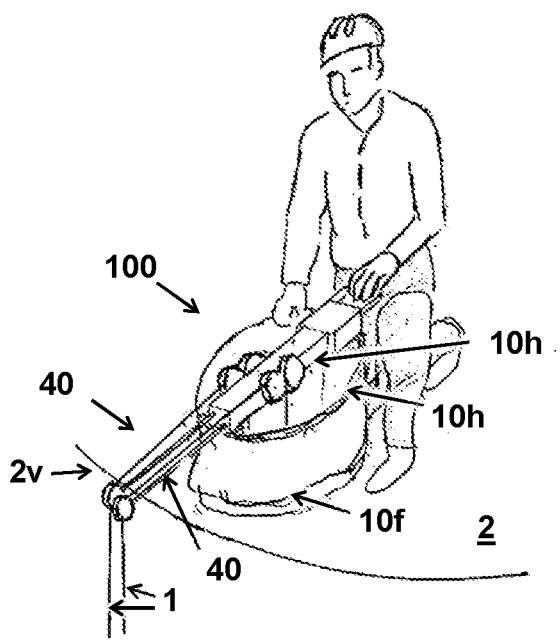
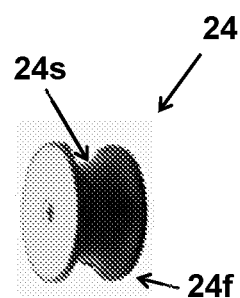
FIG 3C
FIG 3D

ROPE DRIVER, PORTABLE DEVICE FOR DRIVING A ROPE COMPRISING A ROPE DRIVER, KIT, METHOD AND USE

CROSS-REFERENCE TO RELATED APPLICATIONS

This patent application is a U.S. National Phase of PCT International Application No. PCT/NL2020/050780, filed Dec. 11, 2020, which claims priority to Netherlands Application No. 2024446, filed Dec. 12, 2019, which are both expressly incorporated by reference in their entireties, including any references contained therein.

TECHNICAL FIELD AND BACKGROUND

The present disclosure relates to rope handling, in particular to motorized and essentially frictionless lowering, raising and/or storage of industrial rope for use by persons in rope access. The present disclosure further relates to methods for maintenance and inspection of installations, in particular blades of wind turbines, which are largely performed through rope access.

Safely carrying out work at height poses a challenge. Conventional access solutions such as cranes or scaffolding are not suitable for all situations. For example, works or rescue operations at remote locations and/or poorly accessible locations typically depend on rope access solutions. In a typical rope access situation at an altitude a rope, e.g. an industrial climbing rope, is handled manually. Handling operations include anchoring, lowering and/or hoisting of the rope (e.g. lowering of a climbing rope down a cliff or down a tall building to allow a person safe access to a lower location, and raising of the rope after completing work.

In conventional rope access industry rope handling operations are typically performed manually. For example, conventional maintenance and/or inspection operations on blades of operational wind turbines are typically performed by rope access engineers descending from a cover housing of a wind turbine, known as a nacelle, that houses all of the generating components, e.g. the generator, gearbox, drive train and brake assembly. After positioning a primary blade of the turbine in a vertical position, preparatory work preceding and following blade maintenance and inspection by two men currently includes anchoring four ropes in the nacelle. Each rope is carried outside and lowered from an elevated position, e.g. a hub or the nose cone, along the blade to be worked on. After finishing operations on the primary blade and before positioning a subsequent blade in a vertical position the ropes are lifted manually, stored in a container to avoid entanglement and carried from the nose cone into the nacelle. The lifting and storing of one rope is usually performed by two men working together on an outside surface of the nacelle. Depending on hub height this work is physically demanding, time consuming and therefore costly. Further during lowering and/or raising of a rope along a structure to be worked on friction between rope and an outside surface of said structure, e.g. the nose-cone of a wind turbine, may disadvantageously result in increased wear of the rope and/or of the outside surface of said structure.

Accordingly, devices which allow rope handling being more efficient, therefore cheaper, less time consuming, with reduced physical effort, and/or which induce less wear, would be most welcome. In particular for rope access operations on installations requiring long lead times for reaching the installation, e.g. maintenance and/or inspection on blades of wind turbines at onshore and/or offshore parks, there exists a need for more efficient rope handling means.

SUMMARY

Aspects of the present disclosure relate to a portable device for storing and driving, i.e. hoisting or lowering, a rope from an elevated position, e.g. a surface of a tall structure, such as a wind turbine, rig or building. The portable device can advantageously be used to lower a free end of a rope across an edge of a tall structure, e.g. into a valley or along a side wall of a tall structure.

The device is formed of an assembly of a rope storage bag (i.e. container), and a rope driver reversibly connected thereto. When assembled the storage bag serves as a support for the rope driver. By providing a reversibly connectable bag and rope driver, the components can be detached and the device can be more portable. For example, individual components may be carried to a work location separately and assembled on site. Further, bags of different volume (e.g. for holding different lengths of rope) may be interchanged. By providing a pliable or flexible rope storage bag the dimension of the bag can be adapted to an amount of stored rope, e.g. reduced, as rope is removed from the bag.

In preferred embodiments a lower portion of the bag (container) is hardened, e.g. comprising or formed of a solid, e.g. hard plastic, bottom and sidewall. Next to providing a storage volume the hardened lower portion of the bag serves as a solid connection point and stable support for the driver during operation (a stable position of the bag on an altitude surface and as a result a stable position of the connected driver). To that end the hardened part can additionally be reinforced at some places, e.g. at the driver connection points.

In a preferred embodiment, the upper part of the bag, container, is pliable in order to easily close the bag for transport or use the bag for lifting, with or without inclusion of the driver. To this end a pliable skirt portion may be provided along an upper edge of the hardened lower portion. Advantageously, bags with different dimensions for different volumes of rope can be provided, among which bags with two rope compartments. The storage bag is interchangeable with variants with different heights. By providing differently dimensioned bags an operator may select a bag with a dimension that matches the requirements of a particular job (i.e. a required length of rope) thereby reducing transport of excess weight to the work site Improving portability and/or reducing a dimension is particularly advantageous for tools used in rope access, e.g. for equipment used at high altitude.

The rope storage bag comprises a rope storage volume which is bound between a bottom surface of the bag and the outer side wall of the rope storage bag. Provided to the rope storage bag are at least two connection means for reversibly connecting the bag to respective corresponding counterparts on the rope driver. Said means are disposed on reinforced portions along the outer side wall. In embodiments wherein a lower portion of the bag is hardened the connection means are preferably on the hardened part of the bag. In one embodiment of the device the connection means can be a Storz connection. Preferably, the connection also includes a quick release lock system to secure the connection.

The rope driver comprises a frame having at least two arm members extending outwardly from a central portion. Together the arms span (the diameter of) the bag. Preferably, near their respective free ends the arm members are provided with the corresponding counterpart connection means for reversibly connecting the rope driver to the bag. The rope driver further comprises a rope passage having a dimension which matches a diameter of the rope. In one embodiment, the passage is formed between a pair of opposing rollers. That is, between a first roller carried for rotation about a primary axis and a second roller adjacent to the first roller and carried for rotation about a secondary axis parallel to the primary axis. In another embodiment the passage is formed between drive coil and a clamp.

Mounted to the frame is a drive mechanism, e.g. an electric motor, arranged to drive at least one of the first and the second roller or the drive coil. By driving at least one of the first and the second roller, or the drive coil, a section of rope—when inserted—can pass through the rope passage, thus enabling hoisting or lowering, i.e. driving, of the rope. The rope passage is preferably disposed near the central portion of the frame such as to allow the rope to enter or exit the rope storage volume in dependence of a driving direction of the rope. The rope passage is preferably disposed near the central portion of the frame such as to support an optimal distribution of rope in the bag. By positioning the rope passage disposed near the central portion of the frame the rope may enter or exit the rope storage volume in an essentially frictionless fashion (without sliding along a sidewall of the rope storage bag).

The rope driver preferably further comprises a handle, e.g. mounted to the frame, for operating the rope driver and/or carrying the rope driver and/or the assembly of the rope driver and the bag. Advantageously, the rope driver provides motorized control over the rope making lowering and/or raising of the rope faster and/or less labor intensive.

By assembling the rope driver over the rope storage volume a rope may be disposed (e.g. during a rope lowering operation) or stored (e.g. during a rope raising operation) by a single person. By assembling the rope driver over the rope storage bag rope may be disposed directly from or stored directly into the bag simultaneously with a rope driving operation. Directly storing a rope in a bag and/or dispensing a rope from a bag can avoid entanglement of the rope. Allowing the rope to enter/exit the rope storage volume in dependence of a driving direction in an essentially frictionless fashion, e.g. without sliding along a sidewall of the rope storage bag, further mitigates rope entanglement.

Further aspects of the present disclosure relate to a rope access method for maintenance and/or for inspection work on a blade of a wind turbine. The method comprises: halting one of the blades of the wind turbine in a vertical downward position; lowering a free end of a rope anchored at the other end to the wind turbine along the halted vertical blade; performing maintenance and/or inspection work along the length of the blade by a rope access engineer who is anchored to said lowered portion of rope. After performing the maintenance and/or inspection work, the method includes simultaneously raising and storing the rope using the portable device as described herein.

Other aspects of the present disclosure relate to a method, or use of the portable device, for inspection of rope for wear or validity, e.g. as part of regular security maintenance of professional climbing rope. The regular inspection of rope includes the manual groping and viewing of the entire rope. With the present disclosure the passing of rope need not to be done manually but can be done automatically by the disclosure, thereby providing all attention for the actual rope inspection.

Other aspects of the present disclosure relate to a method wherein the rope driving and storage capabilities are utilized in a mechanical advantageous rope and pulley system, e.g. for hoisting a weight or a human.

Other or further aspects of the present disclosure relate to a method wherein the rope driving and storage capabilities are utilized in a method to hoist climbing ropes to a working height, with an advantage that the comparatively heavy climbing ropes, usually four, need not be carried up by a technician but that the ropes can be pulled up by the device.

BRIEF DESCRIPTION OF DRAWINGS

These and other features, aspects, and advantages of the apparatus, systems and methods of the present disclosure will become better understood from the following description, appended claims, and accompanying drawing wherein:

FIG. 3A schematically depicts a rope access engineer carrying an embodiment of a rope driver;

FIG. 3B schematically depicts a rope access engineer carrying an embodiment of the device;

FIG. 3C schematically depicts a rope access engineer and an embodiment of the device used to drive a rope across an edge of a valley;

FIG. 3D provides a photo of a bobbin;

DESCRIPTION OF EMBODIMENTS

Figure 1A:
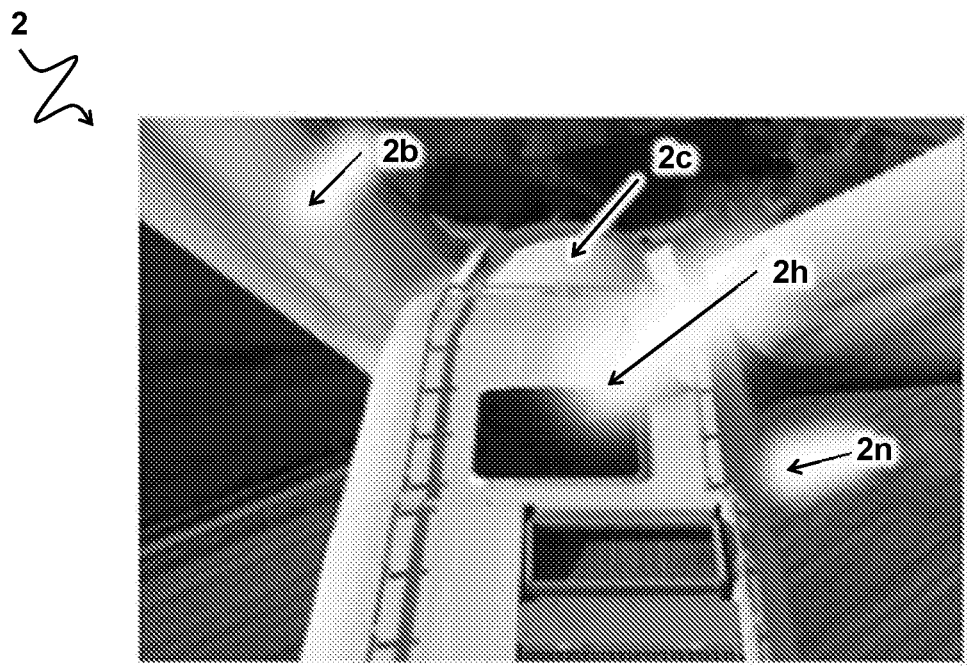
FIG. 1A provides a photograph of a cover housing of a wind turbine.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

Rope access also referred to as industrial climbing allows workers, e.g. rope access engineers or technicians, to access difficult-to-reach locations without the use of scaffolding or cranes. Rope access technicians descend, ascend, and traverse ropes for access and work while attached to a main and back-up rope for safety and work while attached to a main and back-up rope for safety.

The invention is described more fully hereinafter with reference to the accompanying drawings, in which embodiments of the invention are shown. In the drawings, the absolute and relative sizes of systems, components, layers, and regions may be exaggerated for clarity.

Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
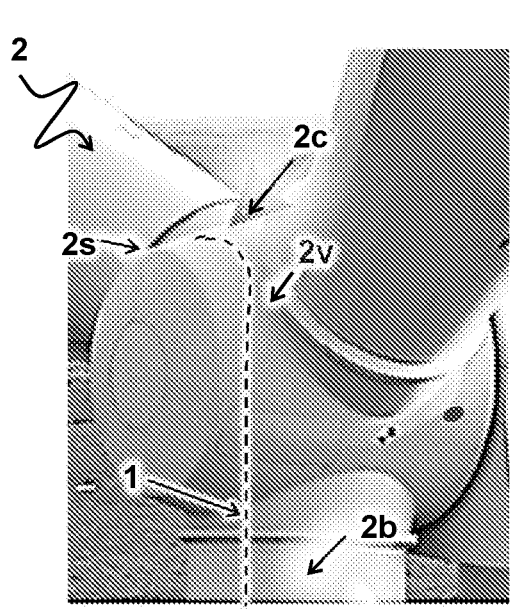
FIG. 1B provides a photograph detailing a nose cone of a wind turbine.
Figure 1C:
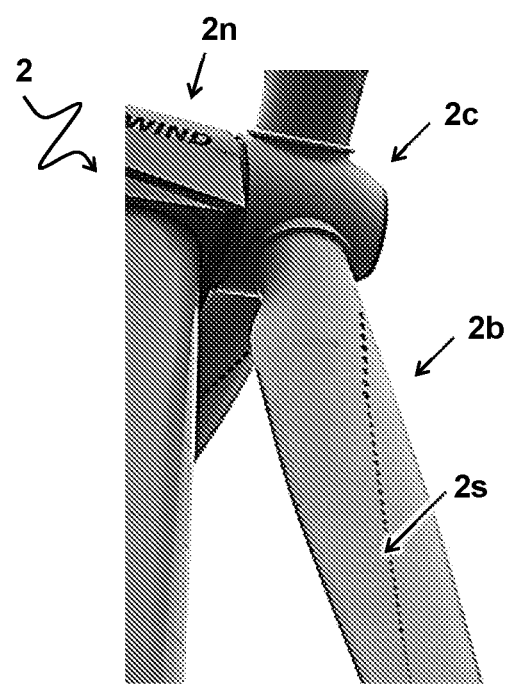
FIG. 1C provides a photograph detailing vortex generators on a blade of a wind turbine.

Now, with reference to FIGS. 1A, 1B, and 1C a conventional manual rope access procedure for performing work on the blades of an operational wind turbine 2 will be explained. Preparatory work preceding and following blade 2b maintenance and inspection commonly includes the following rope handling operations:

Rope lowering: Before a rope is lowered the blade that must be repaired or inspected is put (halted) in a vertical position, e.g. as shown in FIG. 1B. This is commonly done from a control position within the cover housing (i.e. the nacelle) 2n of the turbine. After positioning the blade a rope access engineer steps on an outer surface of the nacelle via a hatch 2h. The engineer carries an industrial climbing rope 1 which is anchored on one end to the wind turbine, e.g. to an anchoring point within the nacelle, to the nose cone 2c. From this position the free end of the rope 1 is lowered manually across an edge 2v of the nose cone 2s along side the blade 2b, e.g. as schematically depicted in FIG. 1B. Note that for clarity only one rope is shown. In practice rope access work is commonly performed by at least two persons each requiring two ropes.

Rope hoisting (lifting): After finishing maintenance and/or inspection works the rope access engineers retrieve the lowered ropes. Lowered ropes are brought in (hoisted) manually and carried from nose cone to the nacelle before continuing work on a next blade. During hoisting the rope may slide or rub along sharp objects or protrusions on the nose cone and/or on the blade, such as blade vortex generators (2s) provided to optimize an airflow across the blade. Friction of rope along such protrusions may lead to wear.

These rope handling operations, in particular the hoisting of the ropes, constitute considerable overhead. For example, lifting one rope is usually performed by two engineers, which is physically heavy and time-consuming, and therefore costly. It will be appreciated that the retrieved rope will need to be stored carefully. For example, one person lifting the rope whilst the other stores the rope in a bag in a disentangled way. Advantageously, the device according to the present disclosure reduces overhead associated with rope handling, e.g. by providing motorized rope hoisting and simultaneous rope storage and/or by other advantages as described herein.

Figure 2A:
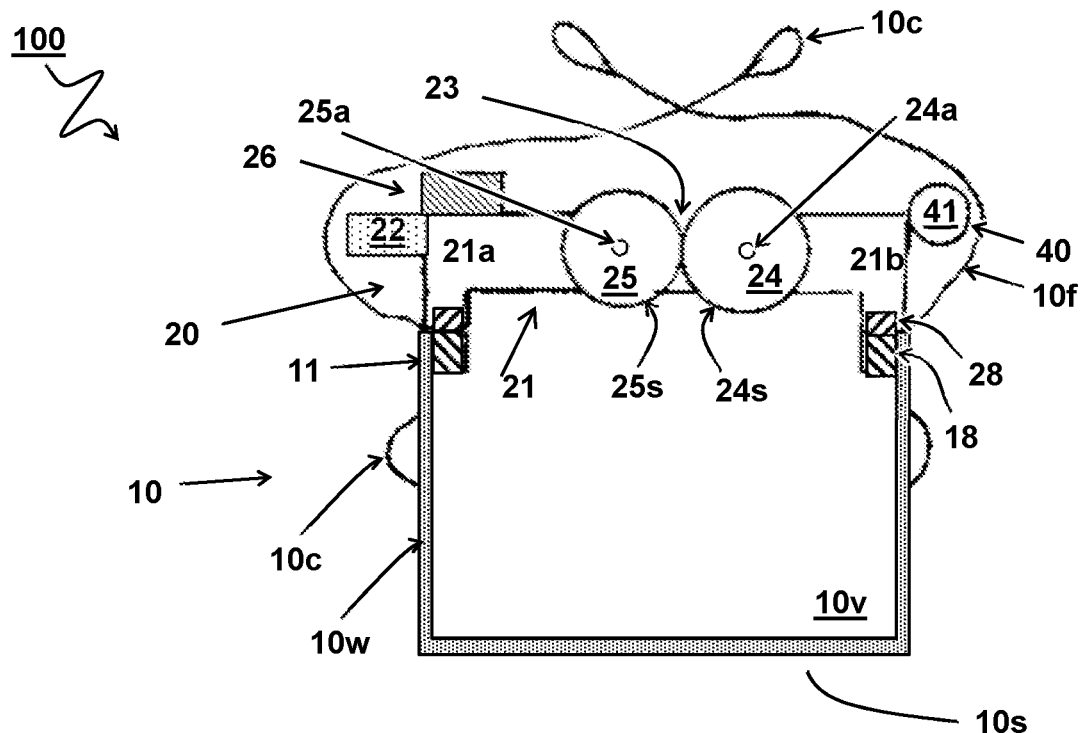
FIG. 2A depicts a schematic cross section side-view image of an embodiment of the device depicted.
Figure 2B:
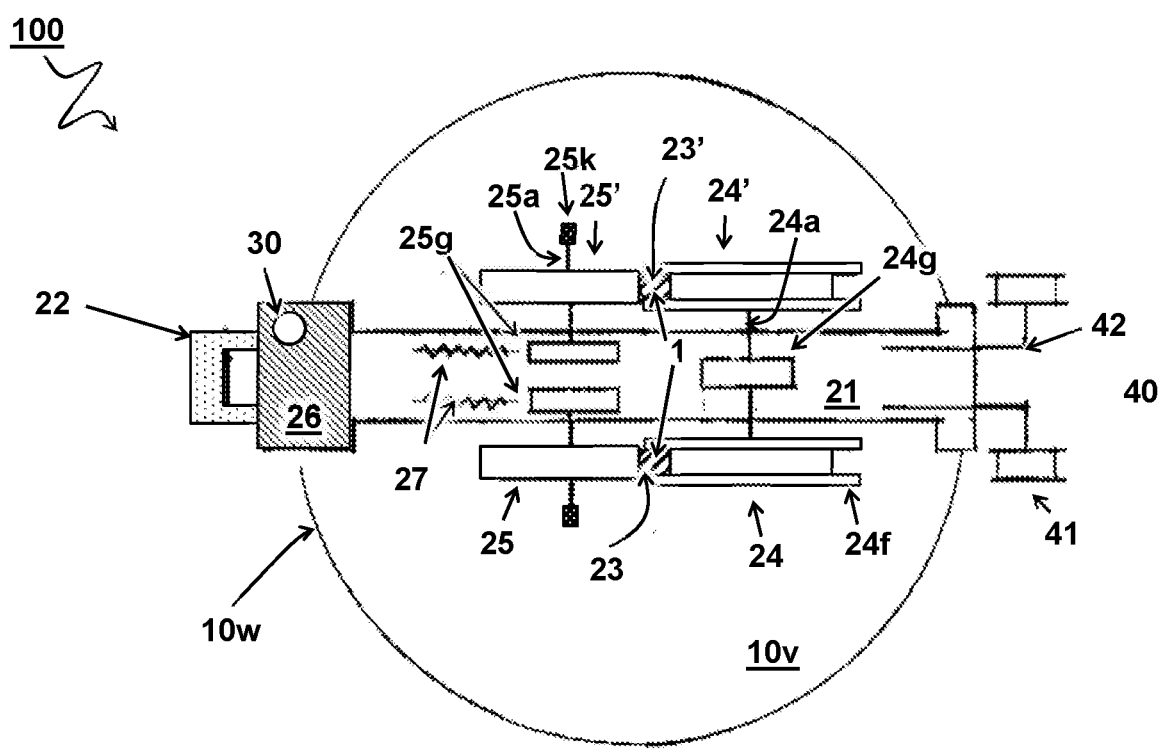
FIG. 2B provides a schematic a top-view image of a preferred embodiment of the device.

FIG. 2A depicts a schematic section side-view image of an embodiment of the device provided with a single rope passage. FIG. 2B provides a schematic top-view image of a strongly preferred embodiment of the device comprising a pair of rope passages.

The device 100 is formed of an assembly of a rope storage bag 10 and a rope driver 20 mutually connected. The rope storage bag 10 has a hardened lower portion including hardened side walls 10w and a bottom surface 10s. The hardened lower portion serves as a support for the rope driver.

The rope storage bag comprises a rope storage volume 10v which is bound between a bottom surface 10s of the rope storage bag 10 and the outer side wall 10w of the rope storage bag.

In a preferred embodiment, e.g. as shown, the bag comprises a pliable or flexible top-portion or skirt portion 10f. The top portion may be a skirt essentially provided along the circumference of the hardened bottom part. The pliable or flexible top-portion 10f, e.g. the skirt portion, can be used to close the bag, e.g. for transport. The pliable or flexible top-portion 10f is preferably suited (dimensioned and sufficiently pliable) to also accommodate the rope driver. The pliable or flexible top-portion is preferably also provided with anchor points, e.g. lifting loops. These anchor points may be used to secure the bag or the assembly and/or to hoist the bag (including a stored rope) and optionally a rope driver up a tall structure. By providing the pliable or flexible top-portion 10f the bag 10 can comply to lifting norms Provided to the rope storage bag are connection means 18 for reversibly connecting the bag to respective corresponding counterparts 28 on the rope driver. Said means 18 are disposed on reinforced portions 11 near a free edge of the outer side wall 10w. The rope storage container is preferably provided with a solid bottom to allow firm positioning of the rope storage container on an exterior surface of the structure to be worked on, e.g. on the nose-cone of a wind turbine.

The rope driver 20 comprises a frame 21. The frame, e.g. as shown, has two arm members 21a, 21b extending outwardly from a central portion. Near their free ends, the arm members are provided with corresponding counterpart connection means 28 for reversibly connecting the rope driver to the bag. The connection means and corresponding counter-parts may be suitably formed by any known means including but not limited to clips, and nuts and bolts. Preferably the means are a push and lock release such as a Storz system. By providing the rope storage bag 10 and the rope driver 20 with respective parts of push and lock release such as a Storz system connection, the rope driver 20 can be easily connected to the rope storage bag 10, e.g. by a push-turn movement. Preferably, a push-lock clip secures the connection between the driver and the bag.

In a preferred embodiment, the rope driver 20 further comprises a first roller 24 carried for rotation about a primary axis 24a and a second roller 25 carried for rotation about a secondary axis 25a parallel to the primary axis. The rollers are mounted to the frame, e.g. on parallel axles, such that a rope passage 23 is formed between adjacent rollers. The rope passage 23 having a dimension which matches the diameter of the rope 1 to grip said rope between outer surfaces 24s, 25 of the first and second rollers.

At least one of the rollers is provided with flanged side portions 24f (see FIG. 2B) to mitigate the rope eluding from the rope passage 23. A roller provided with flanged side portions may be referred to as a bobbin or a pulley wheel.

In preferred embodiments, e.g. as shown in FIG. 2B, the device comprises a plurality of adjacent rollers 24,25&24', 25' to form a plurality of rope passages 23,23' between corresponding pairs of adjacent first and second rollers for driving a plurality of ropes. In an embodiment e.g. as shown in FIG. 2B, the first rollers 24, 24' are both provided along the primary axis 24a, e.g. on a common axle. In some preferred embodiments, e.g. as shown rollers 25, 25' are provided on separate axles so they can be retracted separately to allow inserting or removing of a rope in/from the respective rope passages independent from each other. Between adjacent first and second rollers 24, 25 and 24', 25' two rope passages 23, 23' are formed. Providing a plurality of adjacent rollers advantageously allows raising or lowering of a plurality of ropes. Mounting rollers on a common axle can allow simultaneous driving of a plurality of ropes, e.g. two ropes, with a single electric motor. Mounting rollers on separate axles can allow individual driving of ropes, e.g. only one of two ropes, with a single electric motor. It will be appreciated that other components of the device are likewise preferably arranged to match a number of provided rope passages. For example, a rope guiding system 40 (as discussed in more detail later) may be provided multiple times.

Figure 8A:
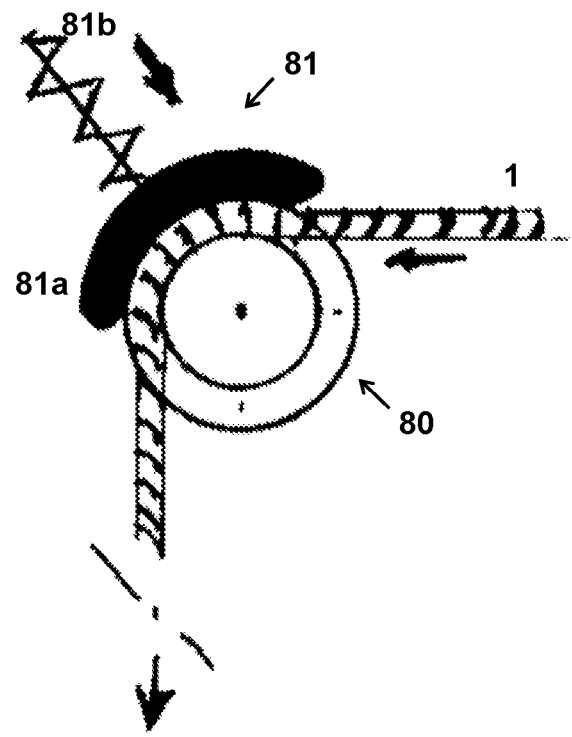
FIG. 8A provides a schematic overview of a side-view image of an embodiment of the device including a drive coil and clamp mechanism.

In another preferred embodiment the rope driver 20 comprises a drive coil 80 and a releasable clamping roller or clamp 81, e.g. as shown in FIG. 8A. As shown, the drive coil is preferably bobbin shaped (having flanged side portions) to avoid the rope from eluding. The clamp typically includes a contact portion 81a and a pressure means 81b, e.g. a spring, for providing a clamping force to hold the rope 1 or ropes onto the drive coil. By releasing the clamping force a rope can be inserted/released from the system as desired.

Figures 8B, 8C:
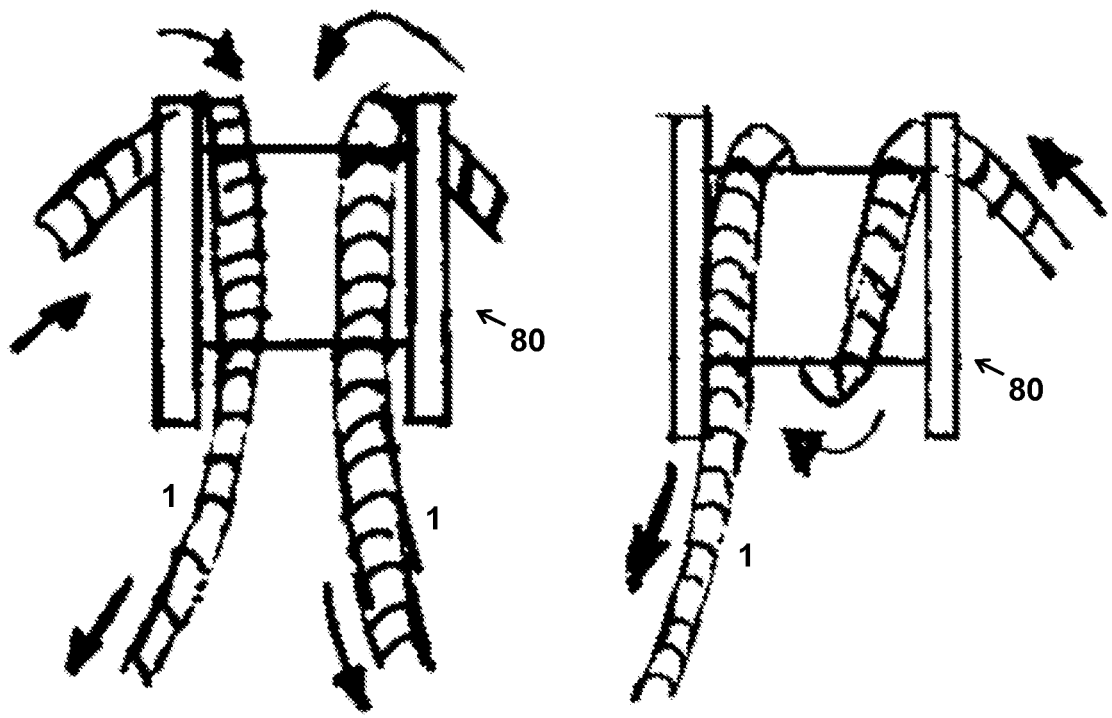
FIGS. 8B and 8C provide a view of an embodiment of a drive coil.

The drive coil preferably has a width to hold either one or two ropes. Advantageously, this configuration allows simultaneously driving of two ropes over one coil (FIG. 8B) or driving one rope with more grip by winding said rope twice over the coil (FIG. 8C). Next to clamping the clamp functions thereby as a protection cover.

Preferably, each rope is stored in a separate rope storage volume to mitigate possible entanglement of ropes. A plurality of rope storage bags dimensioned/arranged for different lengths and/or numbers of rope can be provided to comprise different embodiments of the device. In a preferred embodiment, the rope storage bag may be compartmented, e.g. by inner wall sections.

Mounted to the frame is a housing comprising a drive mechanism 26, e.g. an electric motor. In one embodiment the motor is coupled to primary axle along axis 24a, e.g. through a gear system 24g. Alternatively the drive mechanism is coupled to the drive coil. In another or further embodiment the motor is additionally coupled to axes' 25a through corresponding gear systems 25g, provided the corresponding rollers are not retracted. By rotating the rollers rope can be driven through the rope passages. The driver 20 can drive either one rope arbitrary or two ropes simultaneously depending on a setting of the gear system and/or insertion of a rope in the respective passages. With the single electromotor 26 one or two ropes can be lowered or hoisted.

Preferably, e.g. as shown the rope passage is disposed near the central portion of the frame such as to allow the rope to enter or exit the rope storage volume in dependence of a driving direction of the rope in an essentially frictionless fashion, e.g. without sliding along a sidewall of the rope storage bag.

Preferably, the rope driver 20 is battery operated. Battery operated devices advantageously can improve portability by reducing the need for electrical wiring and/or improved usability at remote locations. In one embodiment the battery and the electromotor 26 would be positioned on opposite longitudinal sides of the frame 20 in order to optimize weight balance.

In some embodiments, e.g. as shown, the device comprises a hodometer 30, preferably with a display, to keep track of a length of raised or lowered rope. Aspects relating to the hodometer will be explained in more detail below.

Mounted to the rope driver is a handle 22 for operating the rope driver, e.g. controlling the driving speed and direction (lowering/lifting) of the ropes and with that to drive the rollers in forward or backward direction. Optionally, the handle can be used to carry the rope driver 20 and/or the assembly of the rope driver and the bag to a work site, e.g. as schematically depicted in FIG. 3A schematically displaying a rope access engineer carrying an embodiment of a rope driver having two rope passages 23,23'. In one embodiment the handle includes a throttle to enable a linear speed control of the rollers.

Preferably, the device further comprises a pulley system 40, comprising one or more pulleys 41. for guiding a driven rope across an edge of the rope storage container. Preferably, a pulley system is provided for each rope passage near the valley-end of the frame by which rope can be guided frictionless from/towards the rollers, i.e. without sliding along a sidewall of the rope storage bag. The one or more pulleys 41 may be provided on a free end of the frame 21. Preferably, the pulleys 41 are positioned on extractable poles 42 which—when not in use—may be retracted within the length of the frame. Providing the pulley system 40 can improve frictionless guiding of a rope into a depth. The pulley system 40 can, during a driving operation, guide a driven rope in an essentially frictionless fashion across the outer wall of the bag, across the edge of the tall structure, and/or across obstacles on the tall structure. Provision of extractable poles can improve clearance between a driven rope and the tall structure (it's sidewall and/or obstacles) e.g. as shown in FIG. 3C. Providing clearance may further reduce friction on a driven rope, e.g. avoiding sliding of a rope across obstacles such as sharp protrusions on a blade of a wind turbine.

In another preferred embodiment the pulley guidance system is replaced by a enclosing profile to guide the rope. Preferably, the enclosing profile is fitted with smooth edges to avoid damaging the rope.

By assembling the rope driver over the rope storage bag, rope may be picked up from respectively stored in the bag simultaneously with the rope driving operation. Direct lowering (picking up) a rope from the storage bag respectively direct lifting (storing) a rope into the storage bag, together with guiding the ropes over the (extended) pulleys, and/or enclosing profiles, can avoid entanglement of rope and keeps the rope in place. Further, when driving two ropes simultaneously and in case the ropes are entangled down the valley, then one of the ropes can be decoupled from the driver to disentangle the ropes by pulling on the other rope.

Providing the pulleys on extractable poles 42 may allow an operator to assume an even safer working position, e.g. further away from an edge. Preferably, the extractable pole is dimensioned to have a length of at least 20 cm, e.g. in a range 20 and 60 cm, e.g. 40 cm. The longer the adjustable pole the further the device and its operator can be positioned from the edge. Like flanged rollers the pulleys are preferably flanged such that the rope does not elope.

The rope storage bag is preferably suitably dimensioned to match the required length of a rope to be used. By not over dimensioning rope and bag the size and weight of the device is minimized, thus increasing portability. An additional advantage is a reduced change of rope entanglement. Whilst the height of the bag is flexible, the diameter of the bag is fixed as it is bound to the dimensions of the rope driver. Typically, the rope storage bag has a diameter in a range between 30 and 60 cm, matching the length of the rope driver. With a diameter of 40 cm and a height of the hardened part of a storage bag of 45 cm approximately 200 m of rope will fit.

The rope storage bag and the rope driver further comprise attachment points 10c, e.g. openings or hooks for carabiners or cow tails, to secure bag and driver to a rope access technician and/or to an anchoring point on the structure to be worked on. Provision of anchoring points improves safety, reduces risk of falling of device and/or of personnel.

In some embodiments, the rope driver 20 comprises gear systems arranged to simultaneously drive the corresponding rollers 24 and 25 in opposite directions of rotation. By driving both rollers of one rope passage grip on the rope during a driving operation may be improved.

FIG. 3B schematically depicts a rope access engineer carrying an embodiment of the device 100 with a rope storage bag 10 including a pliable skirt portion 10f with lifting loops 10c. In the figure the rope driver 20 and rope are not visible as the pliable skirt portion is closed around the driver.

FIG. 3C schematically depicts a rope access engineer operating a portable device 100 according to the disclosure arranged for driving two ropes 1. The device is positioned near an edge 2v of a valley, e.g. an edge 2v of a tall structure such as the nose cone of a wind turbine. The pliable skirt 10f is folded back around the hardened side walls 10h. The rope driver 20 is assembled on, and supported by, the rope storage bag. Clearance between the rope and the edge of the valley is provided by the rope guiding system 40 including extendable poles 42 to guide the rope across the edge.

FIG. 3D provides a photo of a bobbin-shaped roller 24. In some preferred embodiments, e.g. as shown in FIG. 3D, the outer surfaces 24s, 25s of the rollers comprise an anti slip coating, e.g. a rubber coating. Providing the rollers with an anti-slip coating improves grip on the ropes, e.g. during lowering and/or lifting operations may improve.

Figure 4A:
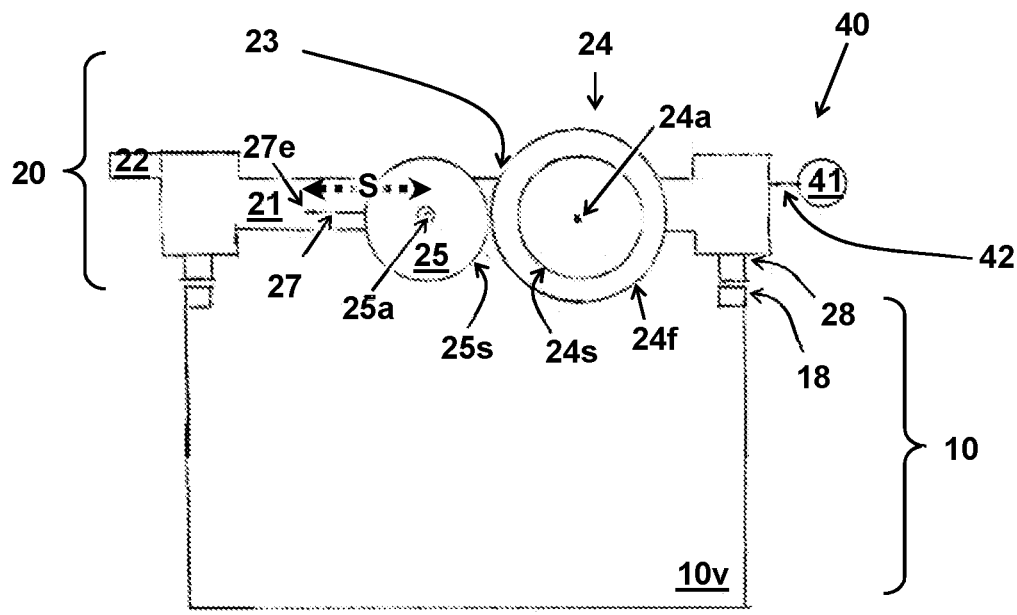
FIGS. 4A and 4B depict schematic side-view images of an embodiment of the device including a sliding mechanism.
Figure 4B:
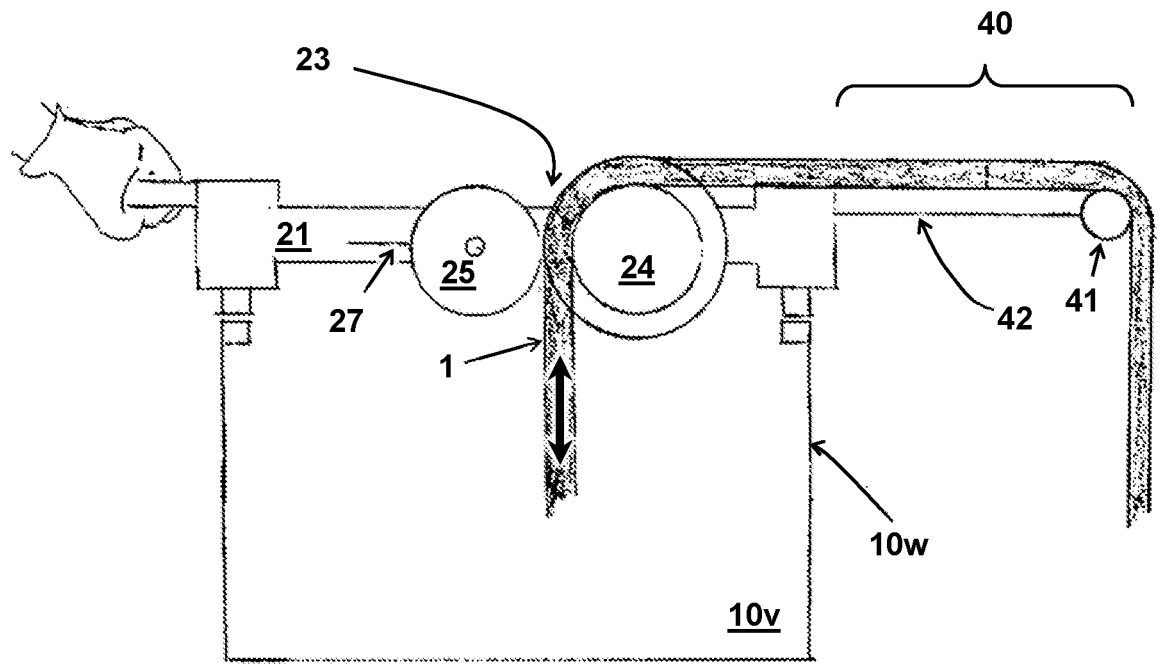
Figure 5A:
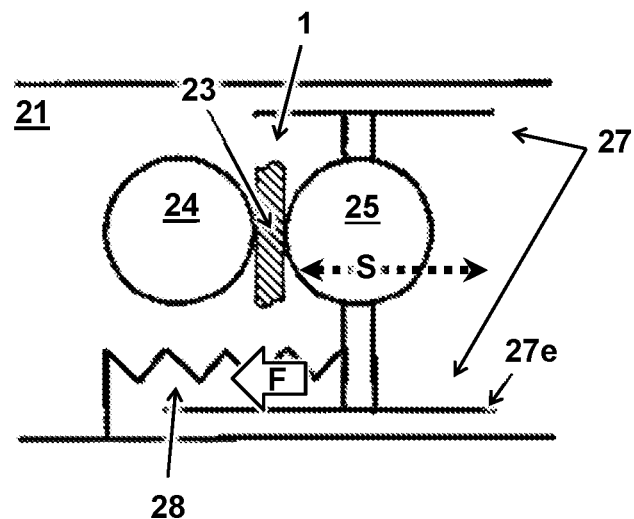
FIGS. 5A and 5B depict schematic detail side-view images of an embodiment of the device including a sliding mechanism.
Figure 5B:
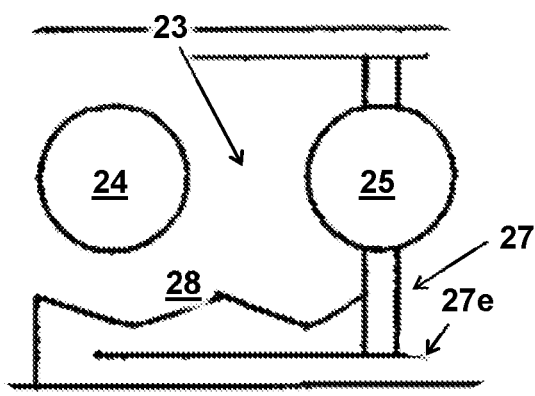

In other or further preferred embodiments, e.g. as shown in FIGS. 2B, 4A and B and 5A and B, at least one of the rollers of each passage (roller 24 or roller 25) is mounted on a sliding mechanism 27 to selectively adjust and maintain a dimension of the rope passage. The rollers are positioned in pairs along the longitudinal sides of the frame such that on each side a rope passage 23 is formed. Rollers 25 are separately retractable e.g. with corresponding buttons 25k, against corresponding spring resistances of springs 28 (see FIGS. 5A and B) in sliding mechanism 27. As will be explained later with reference to FIGS. 5A and B the spring resistances provide for clamping force on the rope between two corresponding rollers 24 and 25. In one embodiment, e.g. as shown in FIG. 4A the first roller 24 is mounted on the frame 21. The second roller 25 is mounted on a sliding mechanism 27 coupled to the frame. By providing at least one of the first and second rollers on a sliding mechanism the rollers may slide S (be pulled) to an end position 27e of the sliding mechanism, forming an open position, e.g. as shown in FIG. 5B, to allow easy inserting or removal of rope in or out of the rope passage. In some preferred embodiments, e.g. as shown in FIGS. 5A and B, the sliding mechanism includes a spring 28 to maintain a contact force F on the rope in the rope passage. Said contact force can advantageously improve grip, e.g. during a hoisting (lifting) operation of a rope. In the embodiment as shown the spring 28 is coupled to sliding mechanism 27 and exerts a force F pulling the second roller towards the first roller 24. By pulling the rollers towards each other grip on the rope 1 is improved. By adjusting the tension on the spring (i.e. adjusting the spring constant) grip on the rope may be adjusted, e.g. in dependence on a weight of a length of rope to be lifted. Optionally a lock may be provided to maintain the rollers in a closed position, e.g. to support the spring to prevent the rope from slipping. Rollers 24 have a bobbin-form such that rollers 25 fall within the bobbin-flanges so that the rope can be held in place preventing it from eluding (running off the rollers). The rope passages formed by rollers 24 and 25 are preferably positioned near the longitudinal middle of the frame in order to optimize disentangled pulling, respectively stowing away of rope.

By providing a sliding mechanism it is possible to insert the rope in the rope passage and clamp the rope in place, e.g. between the rollers or between the drive coil and the clamp. For example, by moving the sliding mechanism to an open position a rope that is already lowered along a blade of a wind turbine may be easily connected to the driver. Accordingly, it allows disconnecting the rope driver and/or the device from a rope at any position along its length. While disconnected the rope driver and/or storage bag may be stored at a safe location, e.g. inside the nacelle. Alternatively or in addition, one or more of the rollers and/or axles can be detachably mounted to the frame such that an operator may prepare the device for driving one or multiple ropes.

In a preferred embodiment the device comprises a clamping mechanism to, in use, provide a contact force onto the rope in the passage so as to improve grip thereon during a driving operation. It will be understood that, as the case may be, said contact force may be provided between the driving coil or roller and clamp 81 or sliding mechanism 27.

In other or further preferred embodiments the device is arranged to halt driving of the rope when a preset maximum pulling force is exceeded. Halting a driving operation can improve safety. In one embodiment, the motor is arranged to halt when a preset maximum torque is exceeded. In another or further preferred embodiment, the gear system and/or the sliding mechanism may be arranged to decouple when a pre-set pulling force is exceeded. It will be appreciated that the maximum pulling force exerted on the device depends on the weight of the length of rope(s) to be used. The weight of rope applied in wind turbines is approximately 65 g/m. Accordingly, when using two times 200 m of rope an upper limit may be about 30 kg (i.e. about 300 N).

In another or further preferred embodiment, the device comprises a hodometer for measuring a length (driving distance) of lowered and/or lifted rope. By including a readable hodometer an operator can keep track of a length of lowered and/or hoisted rope and accordingly keep track of both the position of the end of the rope as well as the weight of rope hanging from the system. In an even more preferred embodiment, the value of the maximum preset pulling force can be adjusted in dependence of an output value of the hodometer 30 thereby improving safety. Further, if following an earlier rope driving operation a specific length of rope has been lowered across the edge, the preset pulling force, e.g. a maximum torque, can be set at a lower value than for a situation wherein a longer length of rope is used. This would also allow repositioning the end of rope to the same height as previous times (in order to reach a previous workspot). Finally, after lowering the desired length of rope, the maximum pulling force can be set, as such safeguarding the current operation.

Figure 6A:
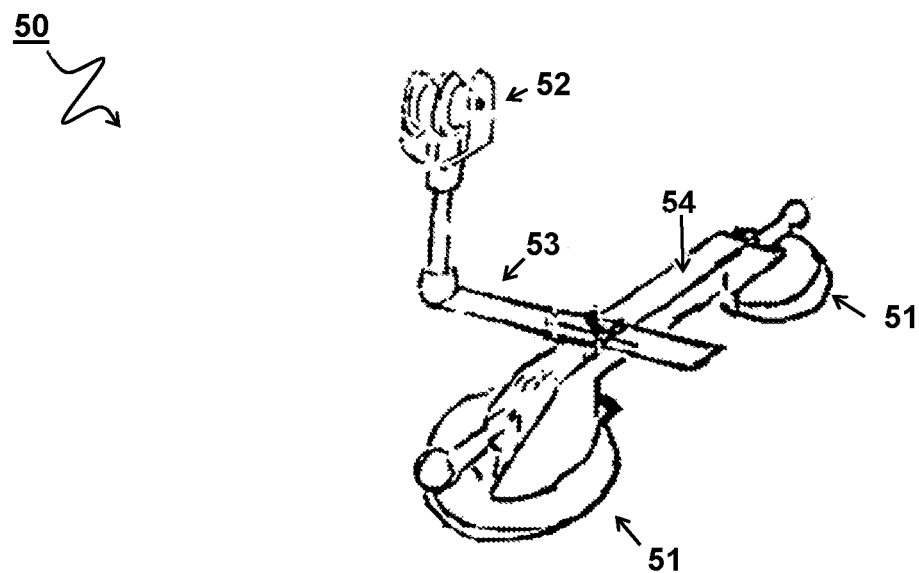
FIGS. 6A and 6B provide schematic perspective view images of a separate free standing pulley system and a kit of a free standing pulley system and the device used to drive a rope across an edge of a valley.
Figure 6B:
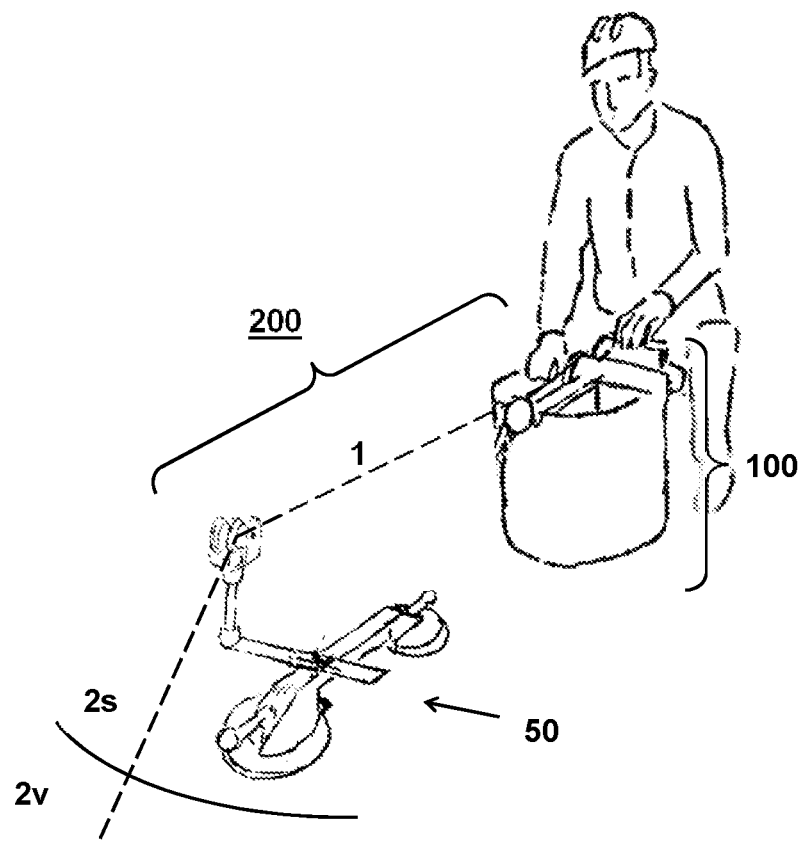

The devices according to the present disclosure may advantageously be used in combination with a separate pulley system, e.g. a free standing pulley system 50 as shown in FIGS. 6A and 6B.

Accordingly, aspects of the present disclosure relate to a kit 200 of the device 100 according to the present disclosure and a separate free standing pulley system 50 arranged to be reversibly anchorable to the tall structure.

The separate pulley system 50 is preferably arranged to be mountable near an edge of the structure to be worked on. By placing a pulley near an edge of a structure to be worked on a rope can be lowered and/or raised across said edge essentially frictionless. Placing a separate extra pulley system near an edge can allow placing other parts of the device, e.g. the driver with rope storage bag 10 at a further distance from such edge. For example, if the structure to be worked on is a cliff, e.g. a ravine, the separate pulley system is preferably arranged to be reversibly mountable (anchored) to soil or rocks. Means to reversibly mount the pulley to a surface of a structure to be worked are known per se and include but are not limited to bolts, nails and hooks. In a preferred embodiment, e.g. as shown in FIGS. 6A and 6B the extra pulley system 50 includes one or more pulleys 52 mounted on the end of an adjustable arm 53. The arm is preferably reversibly mounted on a frame. The extra pulley system is preferably provided with one or more suction cups 51 for mounting the system to a surface of a structure to be worked on, e.g. the nose cone of a wind turbine. Inventors found suction cups to form particularly strong, yet flexible, connection means to mount the extra pulley system to an outer surface of a nose cone of a wind turbine. Preferably, the one or more pulleys 52 of the extra pulley system 50 are mounted such that they may pivot freely around an axis. This can allow a user more freedom in positioning of the device relative to a direction of an edge of the structure to be worked on. By using pivotable pulleys the rope may follow a straight line between driver and pulleys during lifting or lowering. The extra pulley system comprises anchoring points for securing the pulley system to the structure and/or to an operator.

Figure 7:
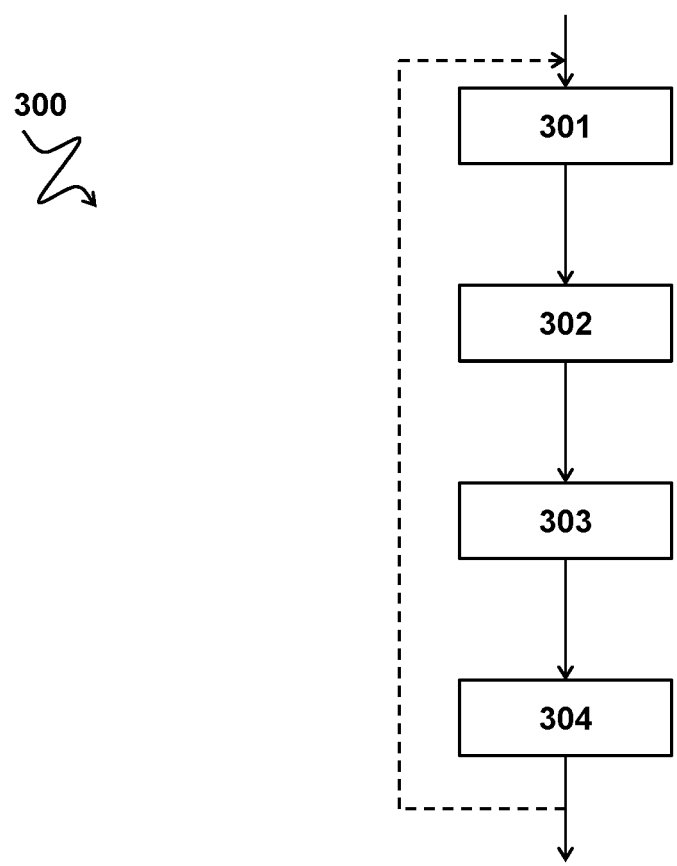
FIG. 7 provides a schematic overview of a rope access method for maintenance or inspection work on a blade of a wind turbine.

Aspects of the present disclose further relate to a method, i.e. a rope access method, for performing maintenance or inspection work on a blade of a wind turbine. In the method the device according to the present disclosure is used to lower, hoist and store rope. In one embodiment, e.g. as schematically shown in FIG. 7, the method 300 comprises:
  halting 301 one of the blades of the wind turbine in a vertical downward position;
  lowering 302 a free end of a rope along the halted vertical blade;
  performing 303 the maintenance or inspection work along a length of the blade by a rope access engineer anchored to said lowered portion of rope;
  simultaneously raising and storing 304 the rope in a rope storage bag after performing the maintenance or inspection work using the portable device according to the present disclosure.
Optionally, the device may be also used in the lowering step to lower the rope along the halted blade. After finishing rope access work on one blade and after raising the ropes, the steps may be suitably repeated for performing work on other blades of the wind turbine.

By using the device as described herein rope handling operations, in particular raising and/or lowering may be improved, namely: better time efficiency, less physical effort, reduced wear and improved safety.

Figure 9:
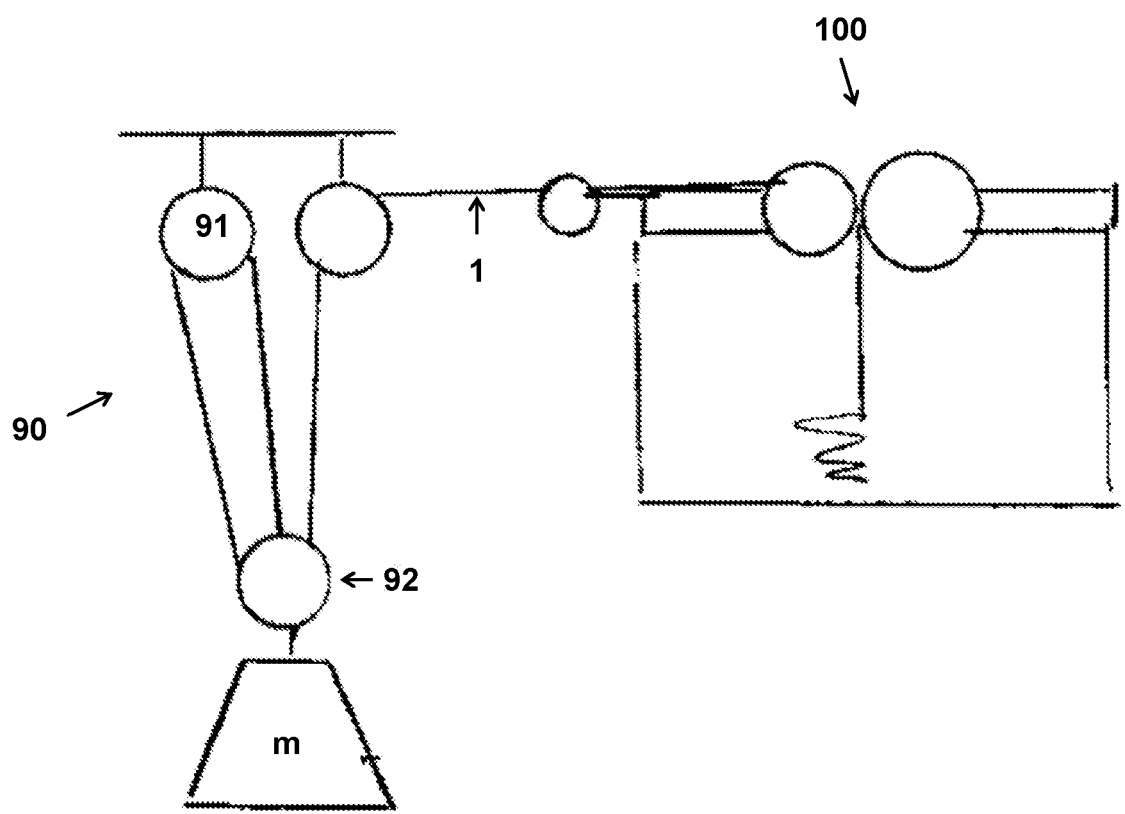
FIG. 9 provides a schematic overview of a portable device in use with a pulley system to hoist a weight.

Other aspects of the present disclosure relate to a method for inspection of rope for wear or validity, as part of regular security maintenance of professional climbing rope. The regular inspection of rope includes the manual groping and viewing of the entire rope. With the present disclosure the passing of rope needs thereby not to be done manually but can be done automatically by the disclosure, with that providing all attention for the actual rope inspection. Other aspects of the present disclosure relate to a method wherein the device 100 according to the invention, in particular its rope driving and storage capabilities are utilized in a mechanical advantageous rope and pulley system, e.g. for hoisting a weight or a human. FIG. 9 schematically depicts an embodiment wherein the device 100 is used in conjunction with a pulley system 90 consisting of two fixed 91 and one movable pulley 92 to lift a weight "m" with a 3:1 mechanical advantage. Using a pulley system allows lifting comparatively heavier objects. It will be understood that the device can be used to similar advantage with other or further pulley systems rigged for other ratios of mechanical advantage.

For the purpose of clarity and a concise description, features are described herein as part of the same or separate embodiments, however, it will be appreciated that the scope of the invention may include embodiments having combinations of all or some of the features described. For example, while embodiments were shown for devices comprising an extractable rope guiding system 40 also alternative ways may be envisaged by those skilled in the art having the benefit of the present disclosure for achieving a similar function and result.

Further parts of the device as described herein may be combined or split up into one or more alternative components. It will be appreciated that further aspects of the present invention relate to the rope driver and the rope storage bag separately. The roper driver and the rope storage bag respectively having the properties as described herein in relation to the device. Accordingly, a rope access engineer may, e.g. before traveling to a remote worksite, elect to equip himself with a single rope driver and a plurality of rope storage bags, e.g. differently dimensioned bags, each connectable to the driver and each provided with a desired length of rope.

The various elements of the embodiments as discussed and shown offer certain advantages, such as simultaneous lifting and storage of a rope. Of course, it is to be appreciated that any one of the above embodiments or processes may be combined with one or more other embodiments or processes to provide even further improvements in finding and matching designs and advantages. It is appreciated that this disclosure offers particular advantages to rope access work, e.g. maintenance and or inspection on wind turbines, and in general can be applied for any application requiring rope access.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s)

or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A portable device for driving a rope from a tall structure, the device for driving a rope comprising an assembly of a rope storage container and a rope driver reversibly connected thereto,
   wherein the rope storage container comprises:
   a rope storage volume bound between a bottom surface and an outer side wall of the rope storage container, wherein the outer side wall is connected to the bottom surface along an edge; and
   at least two connector parts provided on reinforced portions along the outer side wall for reversibly connecting the container to respective ones of at least two corresponding connector counterparts on the rope driver, wherein the rope driver comprises:
   a frame comprising at least two arm members extending outwardly from a central portion, wherein the arm members near their free ends are provided with the respective ones of the corresponding connector counterparts for reversibly connecting the rope driver to the container;
   a rope passage having a dimension that matches a diameter of the rope, wherein the rope passage is formed:
   between a first roller carried for rotation about a primary axis and a second roller adjacent to the first roller and carried for rotation about a secondary axis parallel to the primary axis, or
   between a drive coil and a clamp;
   an electric motor mounted on the frame arranged to drive at least one of the first roller and the second roller, or the drive coil, so as to pass a rope through the rope passage; and
   a handle configured to:
   control the rope driver, and/or
   carry the rope driver and/or the assembly of the rope driver and the rope storage container;
   and
   wherein the rope passage is disposed near the central portion of the frame so as to allow the rope to enter or exit the rope storage volume in dependence of a driving direction of the rope.

2. The device according to claim 1, wherein the bottom surface and outer side wall are formed of a material forming a hardened lower portion of the rope storage container,
   wherein a pliable skirt portion is provided that runs along an upper edge of the hardened lower portion, and
   wherein the pliable skirt portion is arranged to:
   allow an operator to cover the device including the reversibly connected rope driver, and
   close the rope storage volume for transport.

3. The device according to claim 1, wherein the hardened lower portion of the container serves as a solid connection point and stable support for the driver during operation.

4. The device according to claim 1, comprising a plurality of rope passages, each one of the plurality of rope passes being formed:
   between respective adjacent pairs of first and second rollers, or
   between the drive coil and the clamp.

5. The device according to claim 1, wherein the device is arranged to halt driving of the rope when a preset maximum torque is exceeded.

6. The device according to claim 5, wherein the maximum pre-set torque is adjusted in dependence of an output value of the hodometer.

7. The device according to claim 1, wherein the device comprises a hodometer configured to measure a length of rope driven.

8. The device according to claim 1, further comprising a rope guiding system mounted near a free end of one of the at least two arm members for guiding the rope in an essentially frictionless fashion:
   across the outer wall of the container and/or
   across an edge of the tall structure during a driving operation.

9. The device according to claim 1, wherein one or more of the pulleys and one of the first roller and the second roller is bobbin-shaped to prevent the rope from eluding during a driving operation.

10. The device according to claim 1, wherein the rope passage is formed between a drive roller, and a clamping roller or clamp.

11. The device according to claim 1, wherein at least one of the first roller and the second roller or at least one of the pairs of first roller and second roller, or the clamp is mounted on a sliding mechanism.

12. The device according to claim 11, wherein the sliding mechanism includes a spring to maintain the contact force on the rope between adjacent rollers or between the coil and the clamp.

13. A rope access method for maintenance or inspection work on a blade of a wind turbine comprising a plurality of blades using the portable rope driver according to claim 12, the method comprising:
   halting the blades of the wind turbine with one of the blades in a vertical downward position;
   lowering a free portion of a rope anchored at one end to the wind turbine along the halted vertical blade;
   performing the maintenance or inspection work along a length of the blade by a rope access engineer anchored to the lowered portion of rope; and
   simultaneously raising and storing the rope in a rope storage container after performing the maintenance or inspection work using the portable rope driver.

14. The device according to claim 1 including a clamping mechanism, to in use provide a contact force on a part of the rope that is currently in the rope passage.

15. A rope access method for maintenance or inspection work on a blade of a wind turbine comprising a plurality of blades using the portable device according to claim 1, the method comprising:
   halting the blades of the wind turbine with one of the blades in a vertical downward position;
   lowering a free portion of a rope anchored at one end to the wind turbine along the halted vertical blade;
   performing the maintenance or inspection work along a length of the blade by a rope access engineer anchored to the lowered portion of rope; and simultaneously raising and storing the rope in a rope storage container after performing the maintenance or inspection work using the portable device.

16. A use of the device according to claim 1 for rope inspection, the use comprising driving a length of rope at a fixed velocity for visual and/or manual inspection of wear.

17. A use of the device according to claim 1 for lifting a weight, the use comprising using the device in combination with a pulley system rigged to lift weight with mechanical advantage.

18. A rope pick-up method for hoisting one or more climbing ropes to a working height using the device according to claim 1, the method comprising:
lowering down a pickup line from the working height;
tying the one or more climbing ropes to the pickup rope; and
hoisting the climbing ropes to a working height using the device.

19. A kit comprising:
a portable device for driving a rope, the device for driving a rope comprising an assembly of a rope storage container and a rope driver reversibly connected thereto,
wherein the rope storage container comprises:
a rope storage volume bound between a bottom surface and an outer side wall of the rope storage container, wherein the outer side wall is connected to the bottom surface along an edge; and
at least two connector parts provided on reinforced portions along the outer side wall for reversibly connecting the container to respective ones of at least two corresponding connector counterparts on the rope driver,
wherein the rope driver comprises:
a frame comprising at least two arm members extending outwardly from a central portion, wherein the arm members near their free ends are provided with the respective ones of the corresponding connector counterparts for reversibly connecting the rope driver to the container;
a rope passage having a dimension that matches a diameter of the rope, wherein the rope passage is formed:
between a first roller carried for rotation about a primary axis and a second roller adjacent to the first roller and carried for rotation about a secondary axis parallel to the primary axis, or
between a drive coil and a clamp;
an electric motor mounted on the frame arranged to drive at least one of the first roller and the second roller, or the drive coil, so as to pass a rope through the rope passage; and
a handle configured to:
control the rope driver, and/or
carry the rope driver and/or the assembly of the rope driver and the rope storage container;
and
wherein the rope passage is disposed near the central portion of the frame so as to allow the rope to enter or exit the rope storage volume in dependence of a driving direction of the rope; and
a separate free standing rope guiding or pulley system arranged to be reversibly anchorable to a tall structure.

20. A portable rope driver for use in combination with a rope storage container, the rope driver comprising:
a frame comprising at least two arm members extending outwardly from a central portion, wherein the arm members near their free ends are provided with respective ones of corresponding connector counterparts for reversibly connecting the rope driver to respective corresponding connector parts on a rope storage container;
a rope passage having a dimension that matches a diameter of the rope, wherein the passage is formed;
between a first roller carried for rotation about a primary axis and a second roller adjacent to the first roller and carried for rotation about a secondary axis parallel to the primary axis, or
between a drive coil and a clamp;
an electric motor mounted on the frame arranged to drive at least one of the first and the second roller, or the drive coil, so as to pass a rope through the rope passage, and
a handle for controlling configured to:
control the rope driver, and/or
carry the rope driver and/or an assembly of the rope driver and the rope storage container;
wherein the rope passage is disposed near the central portion of the frame.

21. A rope storage container for use in combination with the rope driver according to claim 20, wherein the rope storage container comprises:
a rope storage volume bound between a bottom surface and an outer side wall of the rope storage container, wherein the outer side wall is connected to the bottom surface along an edge, wherein the bottom surface and the outer side wall are formed of a material forming a hardened lower portion of the rope storage container, and wherein a pliable skirt portion is provided that runs along an upper edge of the hardened lower portion, and wherein the pliable skirt portion is arranged to allow an operator to cover the device including the reversibly connected rope driver and to close the rope storage volume for transport; and
at least two connector parts provided on reinforced portions near a free edge of the outer wall for reversibly connecting the rope storage container to respective ones of at least two corresponding counterparts on the rope driver.

* * * * *